(12) United States Patent
Vukovic

(10) Patent No.: US 7,428,846 B2
(45) Date of Patent: Sep. 30, 2008

(54) SHAFT ENCODER WITH ANTI-BACKLASH GEARS

(75) Inventor: Bernard Vukovic, Edmonton (CA)

(73) Assignee: Namco Machine & Gear Works Ltd., Edmonton, Alberta (CA)

( * ) Notice: Subject to any disclaimer, the term of this patent is extended or adjusted under 35 U.S.C. 154(b) by 4 days.

(21) Appl. No.: 11/614,136

(22) Filed: Dec. 21, 2006

(65) Prior Publication Data

US 2008/0149815 A1   Jun. 26, 2008

(51) Int. Cl.
*G01L 3/00* (2006.01)

(52) U.S. Cl. ...................... 73/862.328; 74/409; 74/440; 318/625; 318/630

(58) Field of Classification Search ............ 73/862.328; 74/406, 440; 318/625, 630
See application file for complete search history.

(56) References Cited

U.S. PATENT DOCUMENTS

| | | | |
|---|---|---|---|
| 3,434,025 A * | 3/1969 | Kennedy et al. | ................ 318/8 |
| 4,781,073 A | 11/1988 | Bondhus et al. | |
| 5,045,034 A | 9/1991 | Almeda | |
| 5,329,216 A * | 7/1994 | Hasegawa et al. | ........... 318/654 |
| 5,430,361 A | 7/1995 | Wells | |
| 7,036,777 B2 * | 5/2006 | Diana et al. | ............... 248/183.4 |
| 7,059,427 B2 * | 6/2006 | Power et al. | .................. 175/27 |
| 2004/0226395 A1 * | 11/2004 | Diana et al. | .................... 74/425 |

\* cited by examiner

*Primary Examiner*—Edward Lefkowitz
*Assistant Examiner*—Freddie Kirkland, III
(74) *Attorney, Agent, or Firm*—Bennett Jones LLP

(57) ABSTRACT

An encoder shaft assembly includes a drive shaft having a drive gear, and an array of encoder units each having an encoder shaft and anti-backlash gears which engage the drive gear.

5 Claims, 3 Drawing Sheets

SHAFT ENCODER WITH ANTI-BACKLASH GEARS

FIELD OF THE INVENTION

The present invention relates an encoder shaft, and more particularly to an encoder shaft having anti-backlash gears.

BACKGROUND

A rotary encoder, also called a shaft encoder, is an electromechanical device used to convert the angular position of a shaft or axle to a digital code. As such, it is a type of transducer, as it transforms information about physical positioning to an electronic signal. These devices are used in robotics, in high-quality photographic lenses, in computer input devices (such as optomechanical mice and trackballs), and in rotating radar platforms.

A shaft encoder/transducer is also commonly used in oil and gas drilling, to assist with determination of position or depth in a drilling operation. A drawworks is commonly used to raise and lower a traveling block, from which is suspended a top drive, the drill string and the bottom hole assembly. It is important in many circumstances to know depth of the bottom hole assembly (BHA). Drilling line is spooled on the drawworks. From the drawworks, the drilling line extends to the crown blocks, which are located at the top of the derrick, and then down to the traveling block. The drilling line is passed several times between the traveling blocks and the crown blocks and then fastened to a fixed point called the dead-man anchor. The driller controls the drawworks, which, via the pulley system, controls the position of the traveling block in the derrick. To measure the movement of the traveling blocks, a drawworks encoder (DWE) is mounted on the shaft of the drawworks. One revolution of the drawworks will pay out a certain amount of drilling line and, in turn, move the traveling blocks a certain distance. Calibration of the movement of the traveling block to the revolutions of the drawworks is required.

Small errors in positional encoding may be magnified along the drilling line and the traveling block. It is desirable to be as accurate as possible with a drawworks encoder.

SUMMARY OF THE INVENTION

In one aspect, the present invention comprises an encoder shaft assembly comprising:
(a) an input shaft having a drive gear;
(b) at least one encoder unit comprising a shaft encoder; and
(c) at least one encoder shaft driving the at least one encoder unit, said at least one encoder shaft comprising an anti-backlash gear which engages the drive gear.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows.

DETAILED DESCRIPTION OF PREFERRED EMBODIMENTS

Figure 1:
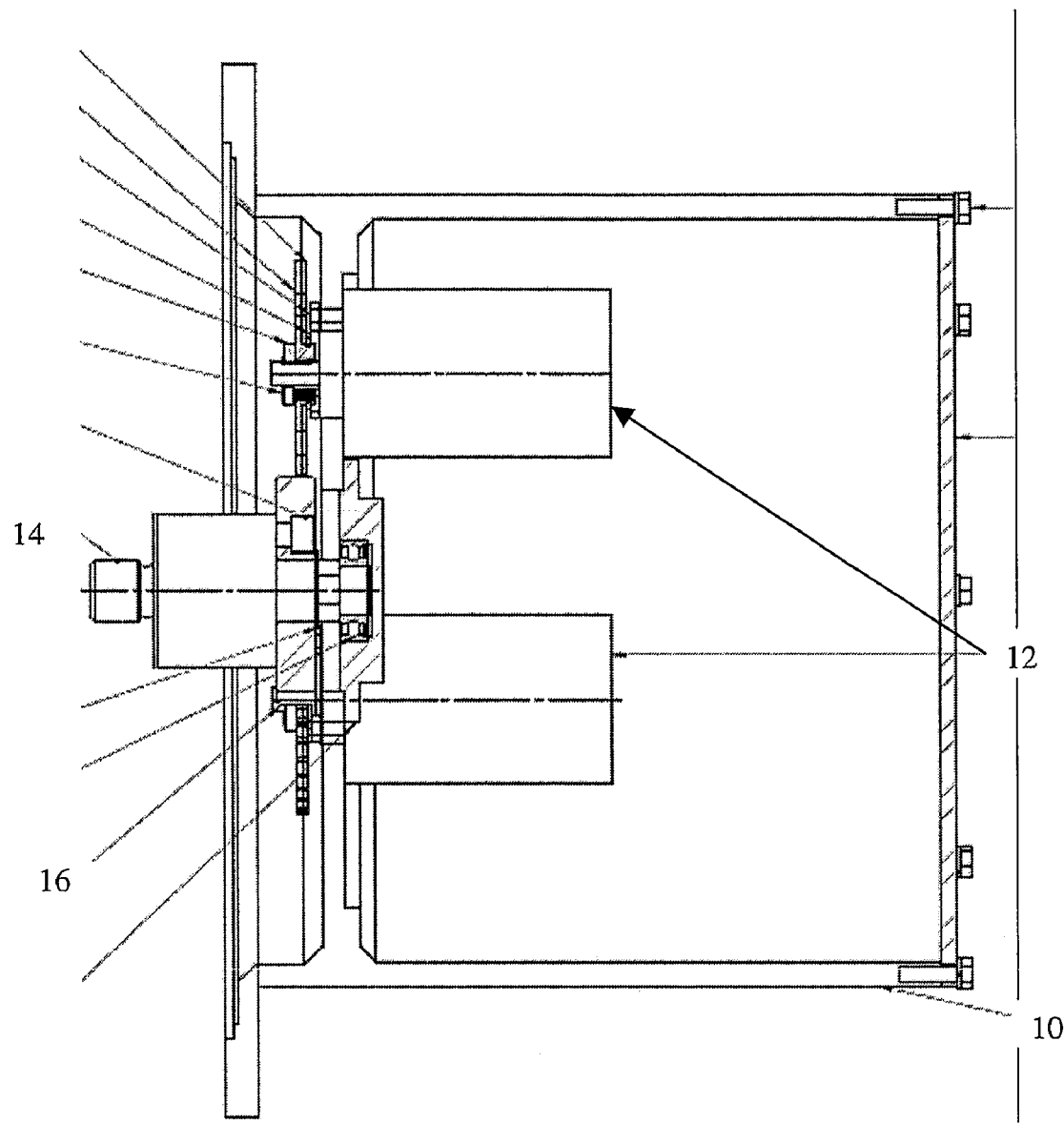
FIG. 1 is a cross-sectional view of an encoder shaft assembly of the present invention.
Figure 2:
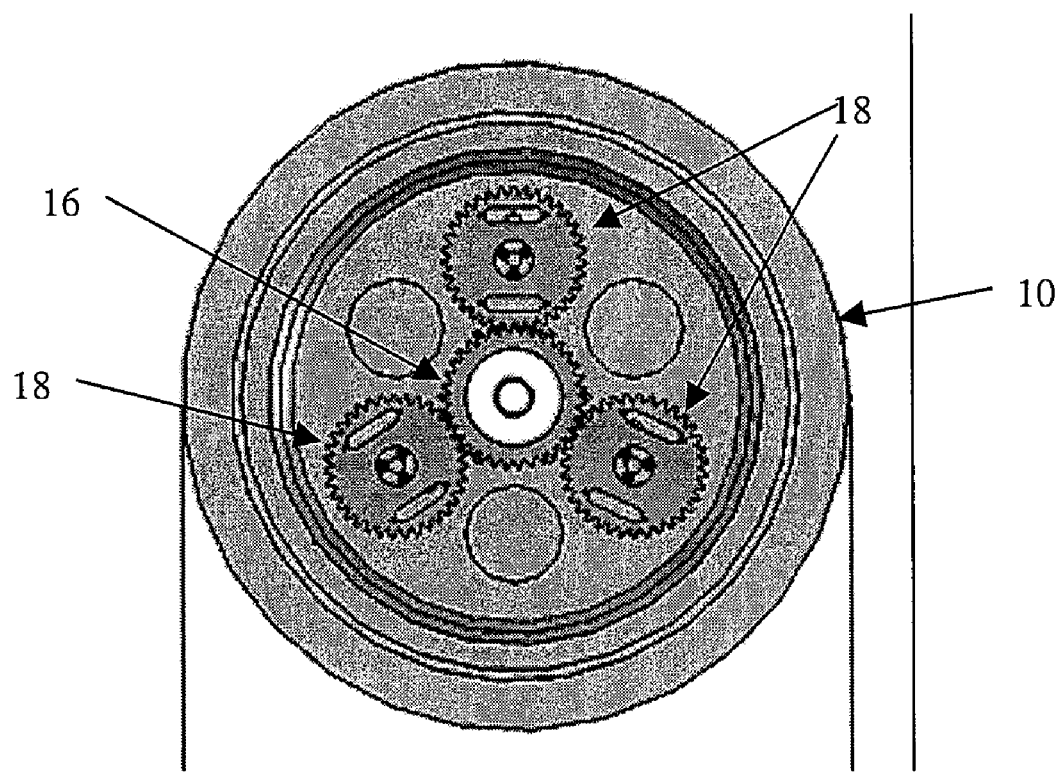
FIG. 2 shows front view of the assembly shown in FIG. 1.
Figure 3:
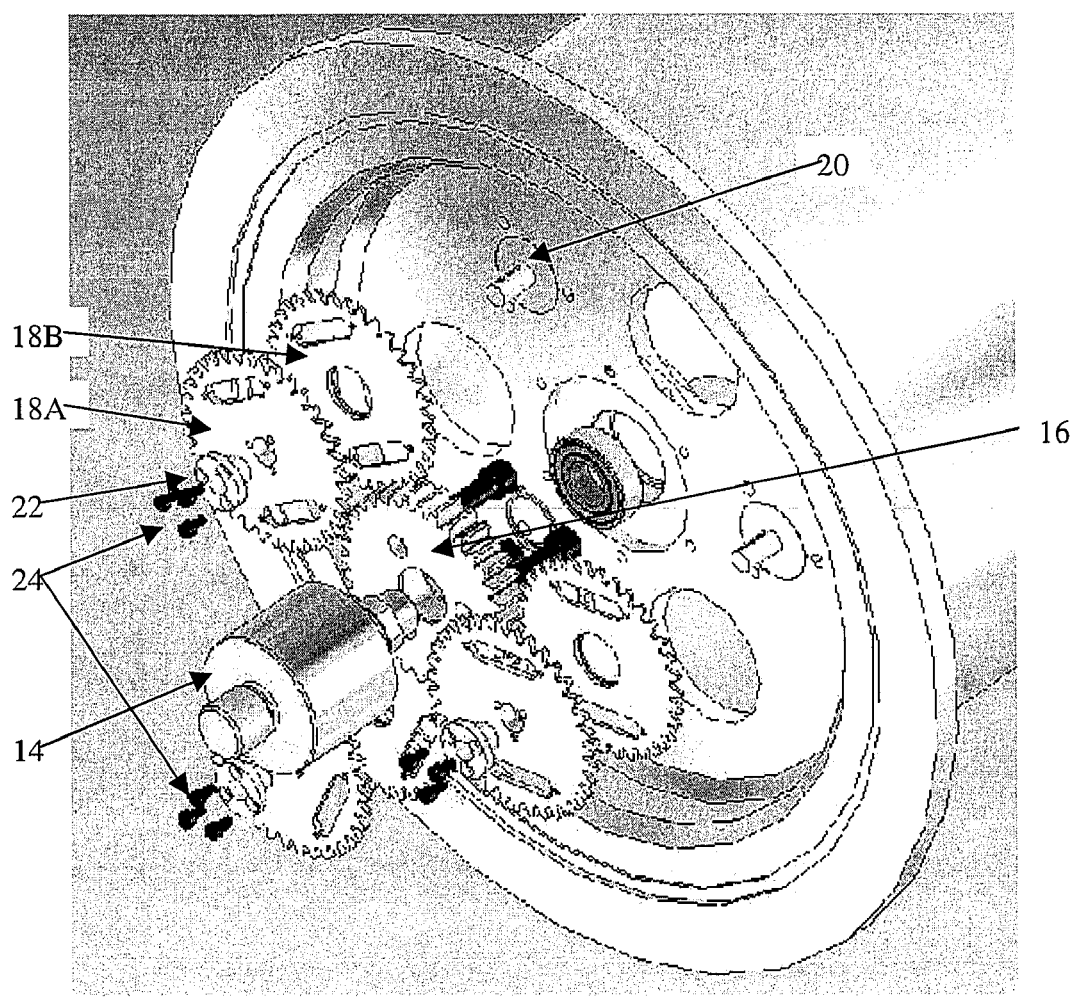
FIG. 3 shows an exploded view of the assembly of FIG. 1.

The present invention relates to a positional encoder, suitable for use with a drawworks. When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

As used herein, a "rotary encoder" or a "shaft encoder" is a device used to convert the angular position of a shaft to a digital code, permitting positional information to be obtained. It may include transducers which output an electronic signal representative of the position or rotation of the shaft.

As used herein, "drawworks" refers to a powered drum which winds and unwinds drilling line, for use in a drilling rig.

In one embodiment, the shaft encoder (10) of the present invention comprises at least one encoding unit (12) which is gear driven by the input shaft (14). In a preferred embodiment, at least two, and preferably three encoding units (12) are provided. The input shaft (14) end is supported by a bearing assembly, as is well known in the art. The encoding unit may be any suitable shaft encoding unit, which are commercially available and may include optical, magnetic or mechanical contact encoders. A preferred encoding unit may be an optical absolute encoder, Profibus DP™, manufactured and sold by Hengstler, a division of Danaher Corporation (Washington, D.C.).

A drive gear (16) is directly attached to the input shaft (14) and drives the encoder gears (18), which in turn drive the encoding units (12). Each encoder gear (18) comprises a pair of anti-backlash gears, to minimize gear backlash with the drive gear (16).

Anti-backlash gears are designed to eliminate the free-play that exists with any gear set. Backlash is the amount of clearance between mated gear teeth in a gear pair. Backlash is created when the tooth thickness of either gear is less than the tooth thickness of an ideal gear. Additional backlash is created when the operating centre distance of the gear pair is less than that for two ideal gears.

In a preferred embodiment, specialized gear designs are utilized to minimize backlash between the drive gear (16) and the encoder gear (18). In one embodiment, the encoder gear (18) is an anti-backlash gear made up of two gears (18A, 18B) mounted adjacent to each other, with one of the gears being secured to the encoder shaft (20) by means of a collar (22) and screws (24). The inner gear (18B) is identical to the outer gear (18A) and is mounted for a limited movement on the outer gear (18A). A spring (not shown), or other biasing means, engages the slots formed in the encoder gear (18) and interconnects the two gears to urge the teeth of one gear out of register with the teeth of the other gear in such a manner that the out-of-register teeth of the two gears completely fill the space between two adjacent teeth on the drive gear (16) with which the anti-backlash gears (18) are meshed. Heavy preloading of the gears making up the anti-backlash gear ensure that the driving and driven teeth on the pair of meshed gears are never unseated. However, too heavy a preload will cause excessive tooth wear when heavy torque are transmitted by the gears. In the present invention, the amount of torque being transmitted is not significant, as the amount of torque necessary to rotate the encoder shaft (20) is not significant. The amount of preload on the encoder gear (18) may be varied by the strength of the spring which preloads the outer and inner gears (18A, 18B).

Different configurations of the spring or lever are possible, and many alternative forms of anti-backlash gears are known to those skilled in the art.

The drive shaft (14) may be directly driven by the axle of a drawworks unit (not shown). In such an application, the three encoding units (12) of the embodiment shown in the Figures may be used to provide precise positional information about the drilling line and traveling block (not shown), and to provide information to a motor controller to effect control over the drawworks. Use of multiple encoding units may provide for more precise information by averaging the information received, or simultaneous multiple information sources for different controlling units.

The encoder shaft assembly (10) of the present invention may be used in any application where high precision shaft encoders are desirable. Oil and gas industry applications include use with drawworks, wireline equipment and topdrives.

What is claimed is:

1. An encoder shaft assembly comprising:
   (a) an input shaft having a drive gear;
   (b) at least one encoder unit comprising a shaft encoder; and
   (c) at least one encoder shaft driving the at least one encoder unit, said at least one encoder shaft comprising an anti-backlash gear which engages the drive gear, wherein said anti-backlash gear comprises two adjacent gears comprising a first gear affixed to the encoder shaft, and a second gear biased to urge the teeth of the second gear out of register with the teeth of the first gear in such a manner that the out-of-register teeth of the first and second gears completely fill the space between two adjacent teeth on the drive gear with which the anti-backlash gear engages.

2. The assembly of claim 1 wherein there are at least two encoder units and at least two encoder shafts.

3. The assembly of claim 2 wherein there are three encoder units and three encoder shafts, arrayed concentrically about the drive gear.

4. The assembly of claim 1 wherein the at least one encoder unit comprises an absolute optical encoder unit.

5. A drawworks for a drilling rig, comprising an encoder shaft assembly of claim 1.

* * * * *